United States Patent [19]

Kawabata

[11] Patent Number: 4,495,415
[45] Date of Patent: Jan. 22, 1985

[54] RADIATION SENSING SYSTEM
[75] Inventor: Takashi Kawabata, Kamakura, Japan
[73] Assignee: Canon kabushiki Kaisha, Tokyo, Japan
[21] Appl. No.: 442,783
[22] Filed: Nov. 18, 1982
[30] Foreign Application Priority Data Nov. 24, 1981 [JP] Japan .............................. 56-188189

[51] Int. Cl.³ .............................................. G01J 5/00
[52] U.S. Cl. ................................................. 250/336.1
[58] Field of Search ....................... 250/336.1; 333/165

[56] References Cited
U.S. PATENT DOCUMENTS
4,384,199  5/1983  Ogino et al. ...................... 250/204

Primary Examiner—Janice A. Howell
Assistant Examiner—Constantine Hannaher
Attorney, Agent, or Firm—Fitzpatrick, Cella, Harper & Scinto

[57] ABSTRACT

Disclosed is a radiation sensing system including signal accumulating type radiation sensor device having at least one radiation sensing element responsive to a radiation to produce an electrical signal, a presetting circuit for presetting the time for the accumulation of the signal by the sensor device, a first control circuit for dividing the signal accumulating time preset by the presetting circuit into a plurality of time sections discontinuous, namely, having separating periods interposed therebetween, and causing the sensor device to effect the accumulation of the produced signal of the sensing element only during each time section, and a second control circuit for reading out the accumulated signal from the sensor device after termination of the signal accumulation by the plurality of time sections.

34 Claims, 6 Drawing Figures

RADIATION SENSING SYSTEM

BACKGROUND OF THE INVENTION

1. Field of the Invention

This invention relates to a radiation sensing system, and particularly to a radiation sensing system using a signal accumulating type radiation sensing device. More specifically, the invention relates to the technique of controlling the signal accumulating time in such radiation sensing system.

2. Description of the Prior Art

In an apparatus using a so-called signal accumulating type radiation sensing device known as CCD, BBD or MOS sensor, where it is desired to obtain an always stable level of sensing output (scanning output) from the sensing device for a radiation whose intensity varies over a very wide range, it is necessary to control the amount of accumulation of the signal of the sensing device to stabilize it in some form or other irrespective of the difference in intensity of the radiation. This can be accomplished, for example, by disposing a diaphragm or a shutter forwardly of the sensing device and controlling the amount of radiation received by the sensing device (this is the same as the control of the exposure amount of the film in a photographic camera) or alternatively by controlling the accumulating time of the signal of the sensing device, namely, the time during which the accumulation of the produced signal is effected in the sensing device. The latter method is advantageous over the former method in that any large-scale apparatus for physically controlling the amount of incident radiation is not necessary.

Various methods of controlling the signal accumulating time of such signal accumulating type radiation sensing device have heretofore been proposed and some of them have been put into practice. For example, a method of presetting an accumulating time corresponding to the then intensity of the radiation prior to the signal accumulation in the sensing device and effecting the signal accumulation under the present accumulating time, and a method of monitoring the amount of accumulated signal during the signal accumulation in the sensing device and stopping the accumulating operation when said amount has reached a predetermined level are known.

In any of the heretofore known control methods, including the above-described two methods, signal accumulation is continuously effected by the sensing device under a controlled time, but this may lead to the following inconveniences.

For example, assuming that the apparatus is used under the illumination by an artificial light source such as a fluorescent lamp driven by an AC power source of 50 Hz (or 60 Hz), the flicker frequency of the illuminating light is 100 Hz (or 120 Hz) and accordingly, the flicker period is 10 msec. (or 50/6 msec.) and in such case, when the signal accumulating time of the sensing device has become, for example, 1 msec., 2 msec. or 3 msec. which is shorter than the flicker period of the illuminating light, if the timing of signal accumulation, i.e., sampling, is not synchronous with the flicker of the illuminating light, the amount of accumulated signal will fluctuate in each signal accumulation. Accordingly, in such a case, in order that the amount of accumulated signal may be constant in each signal accumulation, a new contrivance for controlling the timing of signal accumulation to synchronize it with the flicker of the illuminating light becomes necessary and this leads to the inconvenience that the control circuit becomes large-scale and complicated. Further, in this case, it is seen that if a sampling period fit for both the flicker frequencies 100 Hz and 120 Hz of light sources driven by AC power sources of 50 Hz and 60 Hz, respectively, is calculated, it is an integer times as great as 50 msec., but assuming that such apparatus is applied to a TV camera or a video camera, the field period is 1/60 sec. (field frequency 60 Hz) in the NTSC system adopted in U.S.A. and Japan, for example, and the sampling synchronized with such flicker gives rise to the inconvenience that the field frequency 60 Hz in TV cannot be satisfied.

SUMMARY OF THE INVENTION

The present invention has been made in view of the above-noted situations and a primary object thereof is to provide a novel radiation sensing system which can sweep away the above-noted inconveniences peculiar to the prior art.

It is another object of the present invention to provide a novel radiation sensing system which entirely eliminates the necessity of using such means as the sampling synchronous with the flicker of illuminating light having a predetermined flicker frequency even when the system is used under such illuminating light and even where the signal accumulating time has become shorter than the flicker period of the illuminating light and which can always obtain a stable level of signal.

It is still another object of the present invention to provide a novel radiation sensing system which can always obtain a stable level of signal even when the system is used under illuminating light having a varying flicker period.

Under these objects, according to a preferred embodiment of the present invention, there is provided a novel radiation sensing system which includes signal accumulating type radiation sensor means having at least one radiation sensing element responsive to a radiation to produce an electrical signal, a presetting circuit for presetting the time for the accumulation of the signal by the sensor means, a first control circuit for dividing the signal accumulating time preset by the presetting circuit into a plurality of discontinuous time sections, namely, having separating periods interposed therebetween, and causing the sensor means to effect the accumulation of the produced signal of the sensing element only during each time section, and a second control circuit for reading out the accumulated signal from the sensor means after termination of the signal accumulation by the plurality of time sections.

According to an embodiment which will hereinafter be described, the first control circuit is designed to render the length of each of said time sections always constant and change the number of allotted time sections in accordance with the signal accumulating time preset by the presetting circuit. In this case, with the change of the number of allotted time sections, the length of the separating periods interposed between the time sections is varied, whereby read-out of the signal can be effected always at a fixed timing in any case. The most suitable construction of the first control circuit for achieving such function consists, for example, in utilizing a well-known rate multiplier.

Also, the construction of the sensor means having the sensing element corresponds to a well-known CCD sensor or a well-known BBD sensor. That is, for example, the well-known frame transfer type area CCD sensor or BBD sensor is provided with a two-dimensional array of radiation sensing elements, a two-dimensional array of accumulating elements corresponding to the sensing elements, and a signal reading register (horizontal register) for reading out the accumulated signal of each accumulating element, and in the case of such sensor, the first control circuit is connected or designed to control so that the shift of the signal from the sensing elements to the accumulating elements may occur only during each of said time sections, and the second control circuit is connected or designed to control so that the signal may be read out by the signal reading register when the sum of the time sections has become equal to said preset signal accumulating time.

Alternatively, the heretofore well-known interline type area CCD sensor or BBD sensor, or the line CCD sensor or BBD sensor is provided with a predetermined array of radiation sensing elements and a transfer portion for introducing the produced signal of each sensing element and transferring it to an output portion and, in the case of such sensor, under the present invention, the accumulating elements corresponding to the respective sensing elements are set in the transfer portion, and the first control circuit is connected or designed to control so that the shift of the signals from the sensing elements to the corresponding accumulating elements in the transfer portion is effected only during each of said time sections and the second control circuit is connected or designed to control so that the signal transfer for signal read-out is effected by the transfer portion when the sum of the time sections has become equal to said preset signal accumulating time.

From the foregoing, it will be understood that the present invention is directly applicable to the heretofore well-known CCD sensor or BBD sensor without the necessity of changing the structure of these sensors.

Alternatively, the conventional CCD sensor or BBD sensor may be somewhat changed in their structure in accordance with the present invention. That is, taking as an example the interline type area CCD sensor or BBD sensor or the line CCD sensor or BBD sensor, such sensor may be changed so that an array of accumulating elements for exclusive use for the "time-shared sampling of signals" corresponding to the respective sensing elements is provided between the array of sensing elements and the transfer portion. In this case, according to the present invention, the first control circuit is connected or designed to control so that the shift of the signals from the sensing elements to the corresponding accumulating elements is effected only during said time sections, and the second control circuit is connected or designed to control so that the accumulated signals of the accumulating elements are read out by the transfer portion when the sum of the time sections has become equal to said preset signal accumulating time.

According to another embodiment of the present invention, the system is designed to effect the accumulation of signals by said "time-shared sampling" only when required. Specifically, the first control circuit is designed such that it functions to control the signal accumulation by said time-shared sampling only when the signal accumulating time preset by the presetting circuit is shorter than a predetermined time (for example, the flicker period of the aforementioned artificial illumination source) and that when the preset accumulating time is longer than said predetermined time, the shift of signals from the sensing elements to the accumulating elements is continuously effected during said accumulating time and moreover the control of this time is effected, for example, by the second control circuit so as to correspond to the preset value.

Other objects and features of the present invention will become apparent from the following detailed description thereof taken in conjunction with the accompanying drawings.

BRIEF DESCRIPTION OF THE DRAWINGS

The preferred embodiments of the present invention will hereinafter be described by reference to the accompanying drawings, in which.

DETAILED DESCRIPTION OF THE PREFERRED EMBODIMENTS

Figure 1:
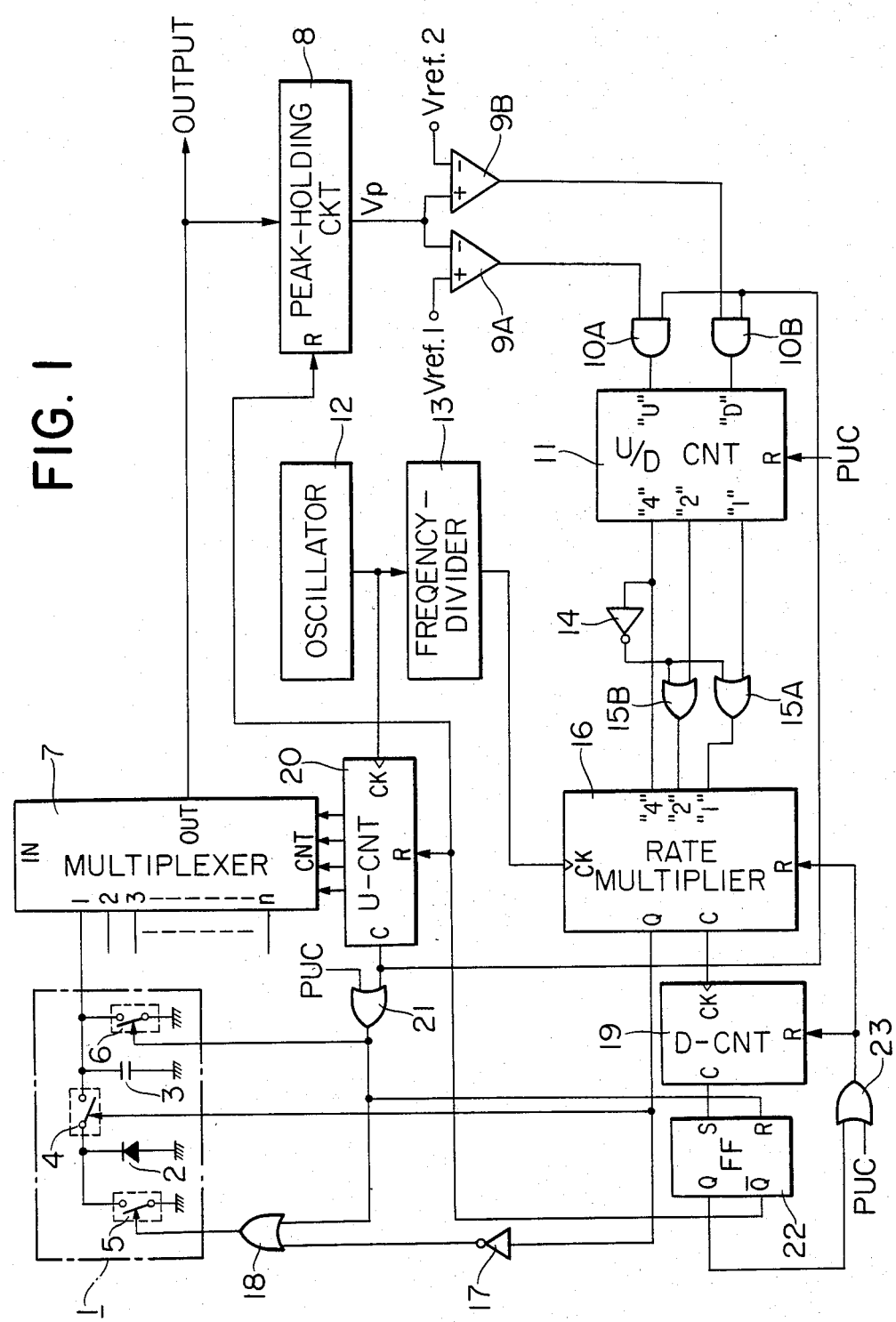
FIG. 1 is a block circuit diagram showing an embodiment of the present invention.

Referring first to FIG. 1 which shows an embodiment of the present invention, reference numeral 1 designates radiation sensing means which includes at least one radiation sensing element 2 responsive to a radiation to produce an electrical signal (for example, a charge) corresponding to the amount of incident radiation, at least one accumulating element 3 corresponding to the sensing element 2, the accumulating element 3 being for introducing thereinto the signal produced by the sensing element 2 and accumulating this signal, a gate element 4 provided between the sensing element 2 and the accumulating element 3 for controlling the introduction of the signal from the sensing element 2 into the accumulating element 3, and gate elements 5 and 6 for clearing the sensing element 2 and the accumulating element 3, respectively. Actually, the sensing means 1 includes a plurality of sets of unit structures including these elements 2-6, but for the purpose of simplicity, only one set is shown in FIG. 1. Of course, the sensing means may be provided with only one set.

Reference numeral 7 designates a multiplexer for time-serializing the accumulated signals of accumulating elements 3 in each set in a predetermined order and reading out the same (in other words, parallel-series-converting the accumulated signals) in case the sensing means is provided with a plurality of sets of unit structures including the elements 2-6, reference numeral 8 denotes a peak-holding circuit for holding the peak value of the time-serial output (for example, voltage output) of the multiplexer 7, and reference characters 9A and 9B designate voltage comparators for comparing the output Vp of the peak-holding circuit 8 with predetermined reference voltages $V_{ref.1}$ and $V_{ref.2}$ ($V_{ref.}$-

$1 < V_{ref.2}$), respectively, and the voltage comparators 9A and 9B together constitute a so-called window comparator 9. The comparator 9A is so connected as to put out a high level when $V_p < V_{ref.1}$, and the comparator 9B is so connected as to put out a high level when $V_p > V_{ref.2}$. Reference character 10A designates an AND gate which receives the output of the comparator 9A and the timing pulse from a circuit to be described, reference character 10B denotes an AND gate which receives the output of the comparator 9B and said timing pulse, reference numeral 11 designates a 3-bit binary up-down counter (hereinafter referred to as the U/D counter) which up-counts by the high level of the output of the AND gate 10A and down-counts by the high level of the output of the AND gate 10B, reference numeral 12 denotes an oscillator or pulse generator circuit which generates a pulse of a predetermined frequency, e.g., 4 KHz or so, reference numeral 13 designates a frequency-divider circuit for frequency-dividing the output pulse of the oscillator 12 and putting out a pulse of a predetermined frequency, e.g., 800 Hz and period 1.25 msec. or so, reference numeral 14 denotes an inverter for inverting the "4" output of the U/D counter 11, reference character 15A designates an OR gate which receives the output of the inverter 14 and the "1" output of the U/D counter 11, reference character 15B denotes an OR gate which receives the output of the inverter 14 and the "2" output of the U/D counter 11, and reference numeral 16 designates a 3-bit rate multiplier which receives the output pulse of the frequency-divider circuit 13 as input and also receives the "4" output of the U/D counter 11 and the outputs of the OR gates 15A and 15B as designated code signals and puts out a divided pulse of a proportion corresponding to the designated codes.

Figure 2:
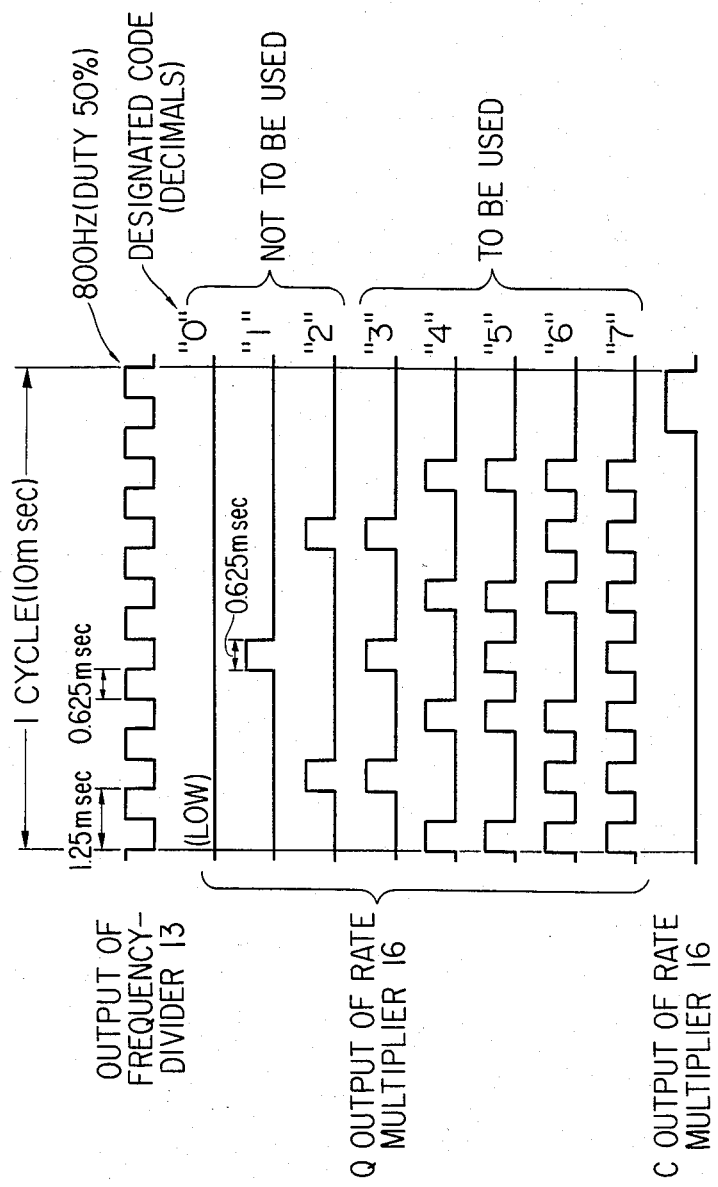
FIG. 2 is a timing chart showing the output of a rate multiplier in the circuitry of FIG. 1 corresponding to an input designating code.

For the output pulse of the frequency-divider circuit 13, rate multiplier 16 generates the divided pulse as shown in FIG. 2 in response to the input designated code signals thereof (decimals "0"–"7"). In the present embodiment, due to the functions of the inverter 14 and the OR gates 15A and 15B, the input code signals of the rate multiplier 16 become "3", "3", "3", "3", "4", "5", "6" and "7" for the count outputs "0", "1", "2", "3", "4", "5", "6" and "7" of the decimal 2 from the U/D counter 11. That is, in the present embodiment, the outputs of the multiplier 16 for input codes "0", "1" and "2" (decimals) are not used and any of these input codes is converted into "3" (decimal) and used. In this case, if the duty of the output pulse of the frequency-divider circuit 13 is 50%, the high level period of a pulse is ½ period=0.625 msec. and thus, the high level period of each of the output pulses of the rate multiplier 16 is 0.625 msec.

The output pulse of the rate multiplier 16 (hereinafter referred to as the Q output) is imparted to the gate element 4 in the sensing means 1 and, during the period in which the Q output is high, the gate element 4 is in its ON state, whereby the introduction of the signal from the sensing element 2 into the accumulating element 3 is effected. On the other hand, the Q output is inverted by the inverter 17, whereafter it is imparted to the gate element 5 in the sensing means 1 through the OR gate 18 and accordingly, during the period in which the Q output is low, the gate element 5 is in its ON state, whereby the sensing element 2 is cleared.

Reference numeral 19 designates a down counter (hereinafter referred to as the D counter) for counting the carry output (hereinafter referred to as the C output) of the rate multiplier. In the present embodiment, the D counter 19 is designed to put out a carry signal (hereinafter referred to as the C signal) at a point of time whereat it has counted two C outputs of the rate multiplier 16.

In the present embodiment, as will hereinafter be described, with the production of the C signal of the D counter 19, the mode shift from a signal accumulating mode to a signal reading mode, and the relations among the count outputs of the U/D counter 11, the designated codes of the rate multiplier 16 and the signal accumulating times obtained thereby are as shown in Table 1 below.

As the rate multiplier 16, the rate multiplier (IC) designated by Model 7497 of Texas Instrument, Inc. is applicable, for example.

TABLE 1

| Outputs of U/D counter 11 (decimals) | Designated codes of rate multiplier 16 (decimals) | Signal accumulating time 0.625 × designated code × 2(msec.) |
|---|---|---|
| 0 | 3 | |
| 1 | 3 | |
| 2 | 3 | 0.625 × 3 × 2 = 3.75 |
| 3 | 3 | |
| 4 | 4 | 0.625 × 4 × 2 = 5.00 |
| 5 | 5 | 0.625 × 5 × 2 = 6.25 |
| 6 | 6 | 0.625 × 6 × 2 = 7.50 |
| 7 | 7 | 0.625 × 7 × 2 = 8.75 |

Reference numeral 20 designates an up counter (hereinafter referred to as the U counter) for receiving the output pulse of the oscillator 12 and forming a control signal for the multiplexer 7. Correspondingly to the count outputs of "1"–"n" (decimals) of the U counter 20, the multiplexer 7 time-serially reads out the accumulated signals of the accumulating elements 3 in the sensing means in a predetermined order (in the order in which they are connected to the input thereof). The U counter 20 is designed to put out a C signal in response to the "n+1"th input pulse. Designated by 21 is an OR gate which receives the C output of the U counter and the power up clear pulse PUC from a power up clear circuit, not shown. The output of this OR gate 21 is imparted to the gate element 6 of the sensing means 1 and, on the other hand, to the gate element 5 of the sensing means 1 through the OR gate 18, and these gate elements 5 and 6 are rendered into ON state by the high level of the output of the OR gate 21 to thereby clear the sensing element 2 and the accumulating elements 3. The C output of the U counter 20 is also imparted to one input of each of the AND gates 10A and 10B, whereby at a point of time whereat the time-serial read-out of the signals of the accumulating elements 3 of the sensing means 1 has been terminated, if necessary, that is, only when the signal accumulating time is inappropriate (that is, when the output of one of the comparators 9A and 9B is high), the count value of the U/D counter 11 is changed (that is, up count occurs when the output of the comparator 9A is high, and down count occurs when the output of the comparator 9B is high). Denoted by 22 is an RS flip-flop (hereinafter referred to as FF) connected so as to be reset by the high level output of the OR gate 21 and set by the C output of the D counter 19. The Q output of FF 22 is imparted on the one hand to the reset inputs R of the rate multiplier 16 and D counter 19 through an OR gate 23 which receives the power up clear pulse, whereby these circuits are reset. The $\overline{Q}$ output of FF 22 is imparted to the reset inputs R of the peak-holding circuit 8 and U counter 20, whereby these circuits are reset. The U/D counter 11 is reset by the pulse PUC.

In the above-described construction, when the power supply to the shown circuitry is initiated, the oscillator 12 starts operating while, on the other hand, the power up clear pulse PUC is put out from a well-known power up clear circuit, not shown. This pulse PUC is imparted to the rate multiplier 16 and D counter 19 through the OR gate 23 and accordingly, these circuits are reset. Also, the U/D counter 11 is reset by the pulse PUC, whereby the count value of the U/D counter 11 becomes "0". The pulse PUC is also imparted to the gate element 6 of the sensing means 1 through the OR gate 21 and further to the gate element 5 of the sensing means 1 through the OR gate 18 and accordingly, these gate elements 5 and 6 in the sensing means 1 are rendered into ON state, whereby the sensing element 2 and the accumulating elements 3 are cleared. Also, FF 22 is reset by the then output of the OR gate 21 and the Q output thereof become low and the $\overline{Q}$ output thereof becomes high. By the high level of the $\overline{Q}$ output, the peak-holding circuit 8 and U counter 20 are restrained in reset state.

In the above-described manner, the system is set to the signal accumulating mode by the resetting of FF 22.

In the above-described set condition, the frequency-divider circuit 13 frequency-divides the output pulse (4 KHz) of the oscillator 12 and imparts a pulse of 800 Hz (duty 50%) to the rate multiplier 16 and, in this condition, the count value of the U/D counter 11 is "0" and therefore, the outputs of both of the OR gates 15A and 15B become high due to the high level of the output of the inverter 14 and accordingly, the designated code of the rate multiplier 16 becomes "3". Accordingly, for the pulse supplied from the frequency-divider circuit 13, the rate multiplier 16 puts out three pulses (Q output) during one cycle as shown at the designated code "3" of FIG. 2. This Q output pulse is imparted to the gate element 4 of the sensing means 1 and this gate element 4 assumes its ON state in response to the Q output pulse, whereby the introduction of the produced signal of the sensing element 2 into the accumulating elements 3 is effected each time. On the other hand, as long as the Q output is low, the output of the inverter 17 is high, whereby in the sensing means 1, the gate element 5 is rendered into ON state and thereby the sensing element 2 is cleared.

The rate multiplier 16, as shown in FIG. 2, puts out C signal immediately before the termination of one cycle, whereby the D counter 19 effects one count down. The next cycle is effected in a similar manner and, when the C signal is again put out from the rate multiplier 16 immediately before that, the D counter 19 puts out C signal in response thereto. FF 22 is set by the C output from the D counter 19, so that the Q output thereof becomes high and the $\overline{Q}$ output thereof becomes low. By the high level of the Q output, the rate multiplier 16 and D counter 19 are restrained in reset state, while by the low level of the $\overline{Q}$ output, the peak-holding circuit 8 and U counter 20 are released from their reset state.

In the above-described manner, by the setting of the FF 22, the system is shifted from the signal accumulating mode to the signal reading mode, and the sensing means 1 receives a total of six Q output pulses from the rate multiplier 16 by the time when the C signal has been put out from the D counter 19 and thus, the signal accumulating time in the previous accumulating mode is 3.75 msec. as shown in Table 1 above.

Now, the U counter 20 released from its reset state effects each one count up in response to the output pulse of the oscillator 12 and, in accordance with the then count value of the U counter 20, the multiplexer 7 has the inputs thereof connected one by one to the output and thus, the accumulated signals of the accumulating elements 3 in the sensing means 1 are successively read out. When the read-out of the signals from the sensing means 1 is effected by the multiplexer 7, the peak-holding circuit 8 holds the peak values of the read-out signals in succession. When the count value of the U counter 20 reaches "n" and the read-out of the accumulated signals of n accumulating elements 3 in the sensing means 1 is completely terminated and thereafter the "n+1"th pulse is imparted to the U counter 20, the U counter 20 puts out C signal. This C output is imparted to the AND gates 10A and 10B and, if the final held value Vp of the peak-holding circuit 8 at this point of time is $V_{ref.1} \leq Vp \leq V_{ref.2}$, that is, if the signal accumulating time is proper, the outputs of the comparators 9A and 9B are both low and therefore, no pulse is put out from the AND gates 10A and 10B and the count value of the U/D counter 11 is not changed, but if $Vp < V_{ref.1}$, that is, if the accumulating time is too short, the output of the comparator 9A becomes high and therefore, a pulse is put out from the AND gate 10A, and on the other hand, if $Vp > V_{ref.2}$, that is, if the accumulating time is too long, the output of the comparator 9B becomes high and therefore, a pulse is put out from the AND gate 10B. If a pulse is put out from the AND gate 10A, the U/D counter 11 effects one count up and its count value becomes "1". However, as previously described, even if the count value of the U/D counter 11 becomes "1", the designated code of the rate multiplier 16 remains to be "3" with the aid of the inverter 14 and AND gates 15A and 15B. That is, it is when the U/D counter 11 counts "4" or more that a change occurs to the designated code of the rate multiplier 16. On the other hand, if a pulse is put out from the AND gate 10B, the U/D counter 11 effects one count down, but in this case, the count value of the U/D counter 11 is "0" and accordingly, the then output pulse of the AND gate 10B is invalidated and the count value of the U/D counter 11 remains to be "0". Accordingly, the designated code of the rate multiplier 16 also remains to be "3".

The C output of the U/D counter 20 is also imparted to the gate element 6 of the sensing means 1 through the OR gate 21 and further to the gate element 5 of the sensing means 1 through the OR gate 18, whereby these gate elements 5 and 6 are rendered into ON state and the sensing element 2 and the accumulating elements 3 are cleared.

Further, FF 22 is reset by the output pulse of the OR gate 21 and thus, the system is again set to the signal accumulating mode.

Thereafter, the operation similar to what has been described above is repeated.

In the present embodiment, as shown in Table 1, the designated codes "3"–"7" of the rate multiplier 16 are obtained for the count values "0"–"7" of the U/D counter 11 and five stages of change are obtained as the signal accumulating time.

Figure 3:
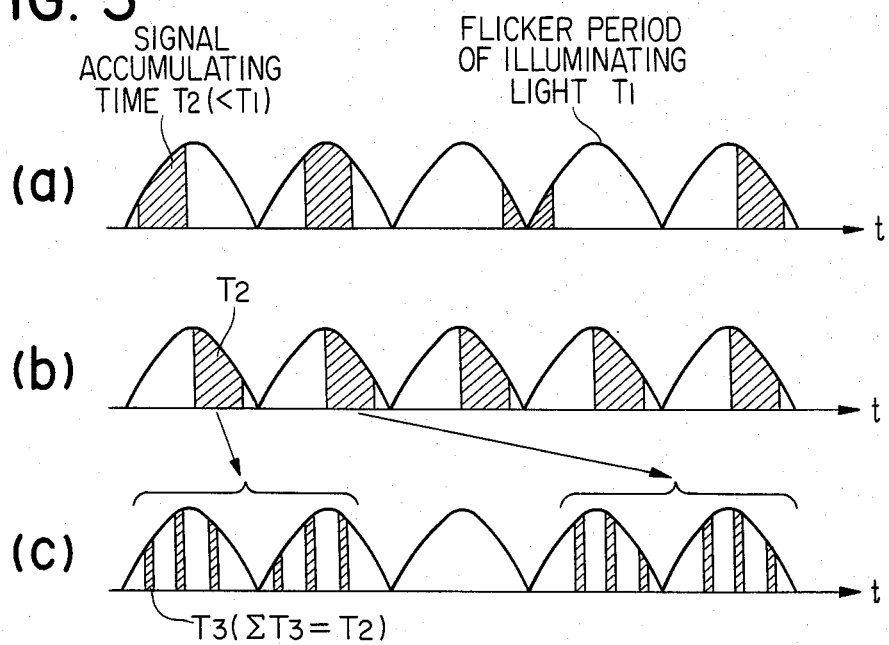
FIG. 3 is a timing chart illustrating the principle of operation of the FIG. 1 embodiment.

Reference is now had to FIG. 3 to describe the conception of the signal accumulation by time-shared sampling in the present invention.

Where, as shown, for example, in FIG. 3 (a), the signal accumulating time $T_2$ assumes a relation $T_2 < T_1$ to the flicker period $T_1$ of illuminating light, if the signal accumulation timing, namely, the sampling timing, is in a random relation to the flicker period $T_1$ of illuminating light, the amount of accumulated signal fluctuates in each signal accumulation as indicated by hatching in FIG. 3 (a) and even during the same accumulating time $T_2$, a stable output cannot be obtained under the influence of the flicker of illuminating light. To avoid this, the sampling timing may be uniformly synchronized with the flicker of illuminating light as shown in FIG. 3 (b), whereas this is very difficult as mentioned previously. Therefore, in the present invention, as shown in FIG. 3 (c), the accumulating time $T_2$ is divided into a plurality of times and they are dispersed in time so that accumulation is effected in each divisional section $T_3$ ($\Sigma T_3 = T_2$) and the total thereof is taken to thereby obtain the accumulating time $T_2$. According to this, due to the effect of the dispersion in time of the divisional section $T_3$, the influence of the flicker of illuminating light disappears and under the same accumulating time, an always stable output can be obtained irrespective of the flicker of illuminating light. FIG. 3 (c) shows the case of $T_3 = T_2/6$ (that is, the designated code of the rate multiplier 16 is "3") in accordance with the foregoing description of the embodiment.

Another embodiment of the present invention will now be described by reference to FIG. 4.

In the embodiment of FIG. 1, the signal accumulating time was 3.75 msec. at the shortest and 8.75 msec. at the longest and was controlled in five stages, but this may lead to the undesirable possibility that the longer range of the accumulating time is deficient. Accordingly, another embodiment which will hereinafter be described intends to realize the enlargement of the accumulating time toward the longer time side, but where the accumulating time exceeds the order of 10 msec., even if the previously described time-shared sampling is not effected, the influence of the flicker of illuminating light does not occur. Accordingly, in said another embodiment, with this point taken into account, design is made such that where the accumulating time exceeds said longest time 8.75 msec., the control by the non-time-shared smapling is effected.

Figure 4:
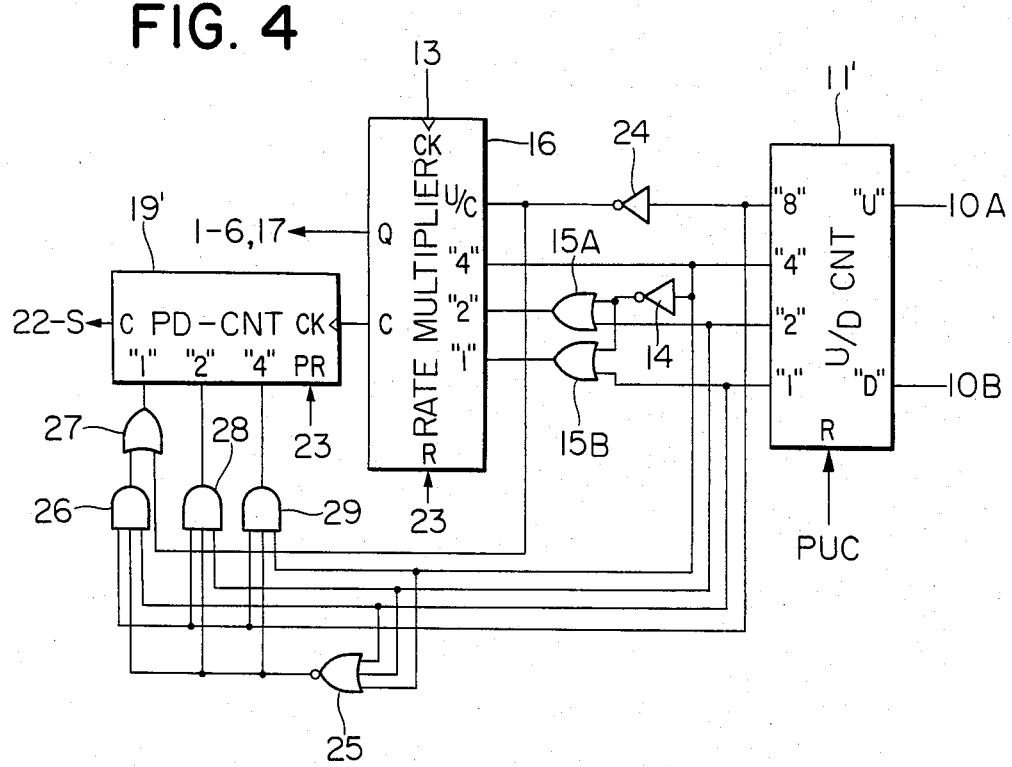
FIG. 4 is a partial block circuit diagram showing particularly the essential portions of another embodiment of the present invention which differ from the construction of the circuitry shown in FIG. 1.

Referring to FIG. 4, there is shown only the constructions of the portions of said another embodiment which differ from the embodiment of FIG. 1, and the portions which are not shown in FIG. 4 are entirely similar in construction to the portions shown in FIG. 1.

Reference material 11' designates a U/D counter corresponding to the U/D counter 11 of FIG. 1 but having a 4-bit construction. Reference numeral 16 denotes a rate multiplier similar to that shown in FIG. 1, and between the code designating input thereof and the "1", "2", "4" outputs of the U/D counter 11', there is provided a circuit including an inverter 14 and OR gates 15A and 15B similar to those shown in FIG. 1. Designated by 24 is an inverter for inverting the "8" output of the U/D counter 11', and the output of the inverter 24 is imparted to the unity/cascade input (hereinafter referred to as the U/C input) of the rate multiplier 16. Although not mentioned in the description of FIG. 1, the rate multiplier 16 puts out a time-shared pulse corresponding to the designated code as previously described when the U/C input is high (accordingly, although not shown in FIG. 1, the U/C input of the rate multiplier 16 is set to high), and when the U/C input becomes low, the rate multiplier 16 stops such function and the Q output thereof always becomes high. Accordingly, in the present embodiment, the rate multiplier 16 puts out a time-shared pulse corresponding to the designated code as long as the count value of the U/D counter 11' is "0"–"7", but whenever the count value of the U/D counter 11' becomes "8" or greater, the Q output thereof becomes high irrespective of the designated code signal (of course, the reset period is excluded). Reference numeral 19' designates a 3-bit presettable down counter (hereinafter referred to as the PD counter) which replaces the D counter 19 of FIG. 1, reference numeral 25 denotes a NOR gate which receives the "1" output, "2" output and "4" output of the U/D counter 11', reference numeral 26 designates an AND gate which receives the "1" output and "8" output of the U/D counter 11' and the output of the NOR gate 25, and reference numeral 27 denotes an OR gate which receives the output of the AND gate 26 and the output of the inverter 24. The output of the OR gate 27 is imparted to the "1" preset input of the PD counter 19'. Reference numeral 28 designates an AND gate which receives the "2" output and "8" output of the U/D counter 11' and the output of the NOR gate 25. The output of the AND gate 28 is imparted to the "2" preset input of the PD counter 19'. Reference numeral 29 denotes an AND gate which receives the "4" output and "8" output of the U/D counter 11' and the output of the NOR gate 25. The output of the AND gate 29 is imparted to the "4" preset input of the PD counter 19'. By the above-described connection and construction of these gate groups 25–29, the preset value of the PD counter 19' becomes "1" in the range in which the count value of the U/D counter 11' is "0"–"7", and is set to the range of "0"–"7" in the range in which the count value of the U/D oounter 11' is "8"–"15", that is, set to the count value of the U/D counter 11' minus "8". The C output of the PD counter 19' is imparted to the set input S of FF 22 of FIG. 1.

In the other points, the present embodiment is entirely similar to the construction of FIG. 1.

Now, in the construction shown in FIG. 4, when the count value of the U/D counter 11' is in the range of "0"–"7", the "8" output thereof is low and accordingly the output of the inverter 24 is high and therefore, the U/C input of the rate multiplier 16 is high and set to the time-shared pulse output mode and the preset value of the PD counter is "1". This has a function equivalent to the construction described in connection with FIG. 1 and thus, in the range of "0"–"7" count of the U/D counter 11', just similarly to the case of the embodiment of FIG. 1, the control of accumulation by the time-shared sampling is effected under the accumulating time which is 3.75 msec. at the shortest and 8.75 msec. at the longest.

On the other hand, for example, assuming that the U/D counter 11' has counted "8", the "8" output thereof becomes high and therefore, the output of the inverter 24 becomes low and accordingly, the rate multiplier 16 renders the Q output always high except during the reset period as previously described, because the U/C input becomes low. On the other hand, when the count value of the U/D counter 11' is "8", the outputs of the gates 27, 28 and 29 are all low and accordingly, the preset value of the PD counter 19' becomes "0". Thus, when the C signal is put out from the rate multiplier 16 immediately before the termination of the previously described one cycle of FIG. 2, the PD counter 19' puts out a C signal in response thereto and sets the FF 22. Thus, when the count value of the U/D counter 11' is "8", a time corresponding to one cycle, namely, an accumulating time of 10 msec., is obtained by the non-time-shared sampling. Thereafter, as the count value of the U/D counter 11' increases to "9", "10", "11", ..., "15", the preset value of the PD counter 19' increases to "1", "2", "3", ..., "7", whereby the accumulating time is increased to 20 msec., 30 msec., 40 msec., ..., 80 msec. during one cycle, namely, at the unit of 10 msec. Of course, any of these is controlled by the non-time-shared sampling mode.

What has been described above may be shown in Table 2 below.

TABLE 2

| U/D counter 11' output (decimals) | PD counter 19' preset value (decimals) | Rate multiplier 16 designated code (decimals) | Output mode | Signal accumulating time (msec.) |
|---|---|---|---|---|
| 0 | 1 | 3 | Time-shared output mode | $0.625 \times 3 \times 2 = 3.75$ |
| 1 | 1 | 3 | | |
| 2 | 1 | 3 | | |
| 3 | 1 | 3 | | |
| 4 | 1 | 4 | | $0.625 \times 4 \times 2 = 5.00$ |
| 5 | 1 | 5 | | $0.625 \times 5 \times 2 = 6.25$ |
| 6 | 1 | 6 | | $0.625 \times 6 \times 2 = 7.50$ |
| 7 | 1 | 7 | | $0.625 \times 7 \times 2 = 8.75$ |
| 8 | 0 | 3 | Non-time-shared output mode | $10 \times 1 = 10$ |
| 9 | 1 | 3 | | $10 \times 2 = 20$ |
| 10 | 2 | 3 | | $10 \times 3 = 30$ |
| 11 | 3 | 3 | | $10 \times 4 = 40$ |
| 12 | 4 | 4 | | $10 \times 5 = 50$ |
| 13 | 5 | 5 | | $10 \times 6 = 60$ |
| 14 | 6 | 6 | | $10 \times 7 = 70$ |
| 15 | 7 | 7 | | $10 \times 8 = 80$ |

Figure 5:
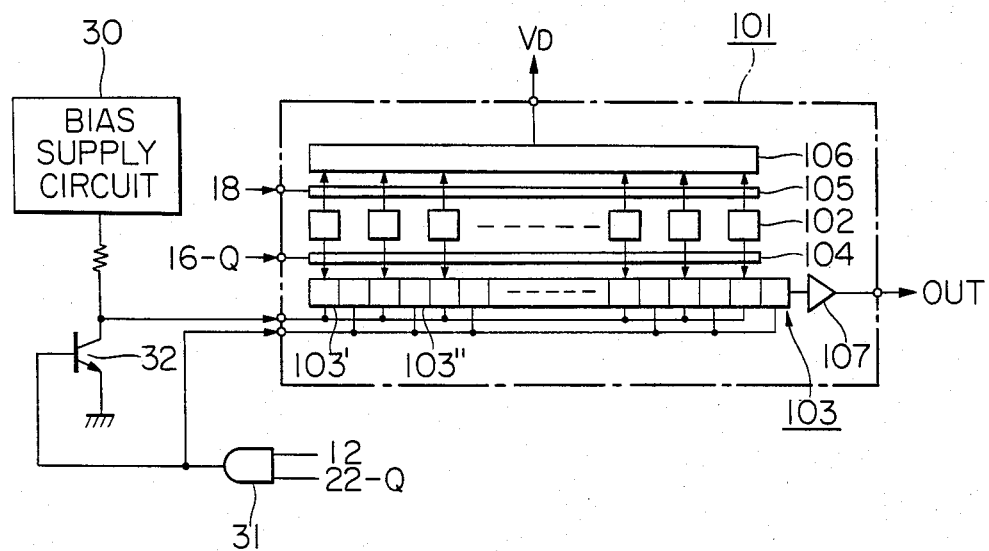
FIG. 5 is a block circuit diagram showing an example of the application of the present invention to a heretofore well-known common line CCD sensor.

The present invention is applicable to the heretofore well-known CCD sensor or the like without the structure thereof being changed. An example thereof will hereinafter be described by reference to FIG. 5. FIG. 5 shows a case where the present invention is applied to a two-phase driving type line CCD sensor having the known clearing function. In FIG. 5, reference numeral 101 designates a two-phase driving type line CCD sensor having the known clearing function, and reference numeral 102 denotes radiation sensing elements (corresponding to the element 2 of FIG. 1) responsive to incident radiation to produce charge signals. There are n such elements arranged in a line, as shown. Reference numeral 103 designates a charge transfer portion (CCD analog shift register) for introducing thereinto the charge signals produced by the sensing elements 102 and transferring them to an output stage (charge-voltage converting output amplifier) 107. The charge transfer portion 103 is of a construction in which two bit groups indicated by 103' and 103" are alternately arranged, and each bit of the bit group 103' corresponding to each sensing element 102 is applied as an accumulating element (corresponding to the element 3 of FIG. 1) for the time-shared sampling of charge signals. Reference numeral 104 designates a shift gate (corresponding to the element 4 of FIG. 1) provided between the sensing element array and the transfer portion 103 to control the introduction of the charge from each sensing element 102 into each corresponding bit of the bit group 103', reference numeral 106 denotes a charge clearing portion (to which a bias voltage $V_D$ is imparted) for clearing the charge which has flowed thereinto, and reference numeral 105 designates a clear gate (corresponding to the element 5 of FIG. 1) provided between the sensing element array and the clearing portion 106 to control the inflow of the charge from each sensing element 102 into the clearing portion 106.

For the CCD sensor 101 of such construction, the output of the OR gate 18 of FIG. 1 is imparted to the clear gate 105 and the Q output of the rate multiplier 16 of FIG. 1 or 4 is imparted to the shift gate 104. On the other hand, the bias voltage from a bias supply circuit 30 which produces a predetermined bias voltage is imparted to the bit group 103' of the transfer portion 103. This bias voltage is continuously imparted in the accumulating mode, but in the reading mode, it is made into a pulse by an npn transistor 32 to the base of which is imparted the output of an AND gate 31 which receives the output pulse of the oscillator 12 of FIG. 1 and the Q output of FF 22. The pulse voltage in this case becomes opposite in phase to the output pulse of the oscillator 12 due to the function of the transistor 32. The output of the AND gate 31 is imparted to the bit group 103" of the transfer portion 103. Here, the oscillator 12 should be designed such that the duty of the output pulse thereof is 50%.

In the above-described construction, when the system is in the accumulating mode due to the resetting of FF 22, the bias voltage is continuously supplied from the bias supply circuit 30 to the bit group 103' of the transfer portion 103 and in this condition, the shift gate 104 is controlled by the Q output of the rate multiplier 16, whereby during the sampling period determined by the Q output of the rate multiplier 16, the produced charge of each sensing element 102 is introduced into and accumulated in each corresponding bit of the bit group 103' of the transfer portion 103 through the shift gate 104. Also, the clear gate 105 is controlled by the output of the OR gate 18, whereby the charge produced by each sensing element 102 during the non-sampling period is introduced into and cleared in the clearing portion 106 through the clear gate 105.

When the system then shifts to the reading mode due to the setting of FF 22, the pulse from the oscillator 12 is put out from the AND gate 31, whereby pulses of opposite phases are imparted to the bit groups 103' and 103" of the transfer portion 103 and therefore, the accumulated charge of the bit group 103' is transferred to the output stage 107 through the transfer portion 103 in a known manner and is time-serially put out from the output stage 107 in the form of a voltage.

Figure 6:
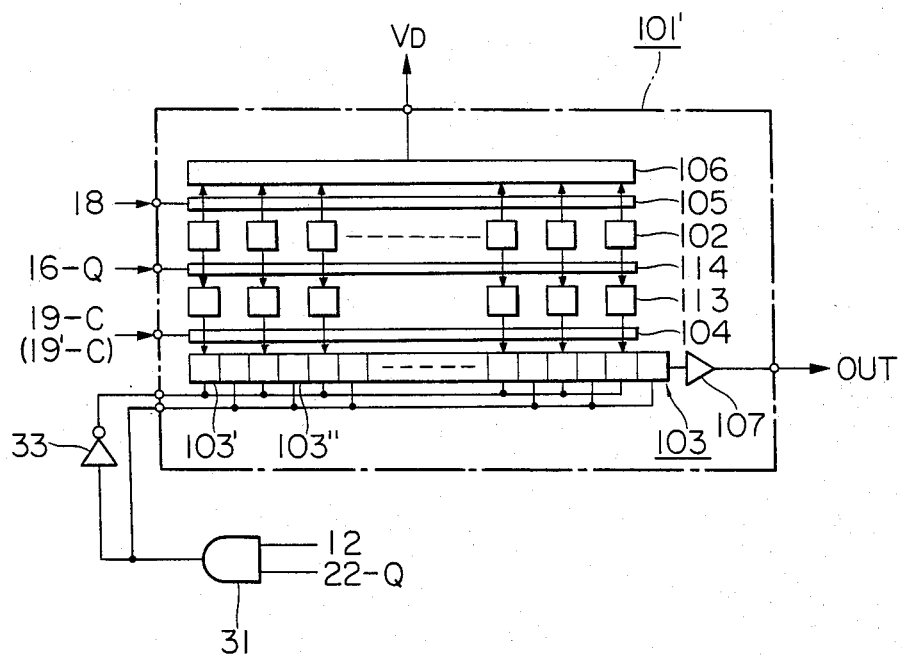
FIG. 6 is a block circuit diagram showing an example of the application of the present invention to a line CCD sensor whose structure has been somewhat changed in accordance with the present invention.

What has been described above is an example of the case where the present invention is directly applied to the known CCD sensor, but alternatively, the known CCD sensor may be somewhat changed in its structure in accordance with the present invention. An example thereof will hereinafter be described by reference to FIG. 6. In the line CCD sensor 101' shown in FIG. 6, the elements designated by reference numerals similar to those in the line CCD sensor 101 shown in FIG. 5 are entirely identical to those already described. This reformed CCD sensor 101' has, between the sensing element array and the shift gate 104, new accumulating elements 113 (corresponding to the elements 3 of FIG. 1 or the bit group 103' of FIG. 5) for introducing and accumulating therein the produced charge of each sensing element 102 in the accumulating mode and a control gate 114 (corresponding to the element 4 of FIG. 1 or the shift gate 104 of FIG. 5) for controlling the introduction of the charge from each sensing element 102 into each accumulating element 113.

The Q output of the rate multiplier 16 of FIG. 1 or 4 is imparted to the control gate 114, and the C output of the D counter 19 of FIG. 1 or the C output of the PD counter 19' of FIG. 4 is imparted to the shift gate 106.

In such construction, the control gate 114 is controlled by the Q output of the rate multiplier 16 in the accumulating mode, whereby the charge produced by each sensing element 102 during the sampling period is introduced into and accumulated in each corresponding accumulating element 113 through the control gate 114. Of course, the charge produced during the non-sampling period is cleared by the clearing portion 106 as already described. When the system shifts to the reading mode due to the outputting of the C signal from the D counter 19 or the PD counter 19', the accumulated charge of each accumulating element 113 is introduced into each bit of the bit group 103' of the transfer portion 103 by this C signal through the shift gate 104, whereafter it is transferred to the output stage 107 by the transfer portion 103 in a well-known manner.

The output of the AND gate 31 is imparted to the bit group 103" of the transfer portion 103, and the output of the inverter 33 which inverts the output of the AND gate 31 is imparted to the bit group 103'. Alternatively, the AND gate 31 may not be provided and the output pulse of the oscillator 12 may be imparted to the bit group 103" and the inverted pulse thereof (the output of the inverter 33) may be imparted to the bit group 103'. In this case, the accumulation of signals and the reading of signals can be accomplished together with each other.

The preferred embodiments of the present invention have been described above, but it should be understood that the present invention is not restricted to the embodiments disclosed herein and various modifications may be made thereto within the scope of the spirit of the present invention, and it is intended that the present invention include all of those modifications within the scope of the appended claims.

What we claim is:

1. A radiation sensing system including:
   (A) signal accumulating type radiation sensor means having at least one radiation sensing element responsive to a radiation to produce an electrical signal;
   (B) presetting means for presetting the signal accumulating time of said sensor means;
   (C) first control means for dividing the signal accumulating time preset by said presetting means into a plurality of discontinuous time sections and causing said sensor means to accumulate the produced signal of said sensing element only during each of said time sections; and
   (D) second control means for reading out the accumulated signal from said sensor means after termination of the signal accumulation by said plurality of time sections.

2. The system according to claim 1, wherein said first control means is designed to vary the number of sections of the accumulating time in accordance with the length of the signal accumulating time preset by said presetting means.

3. The system according to claim 2, wherein said first control means is designed to divide said preset accumulating time so that the time lengths of said time sections are equal to each other.

4. The system according to claim 3, wherein said first control means is designed to divide said preset accumulating time into a plurality of discontinuous time sections which are within a predetermined period.

5. The system according to claim 4, wherein said first control means includes a rate multiplier.

6. The system according to claim 1, 2, 3, 4 or 5, where said presetting means is designed to preset said signal accumulating time on the basis of the level of the signal read out from said sensor means.

7. The system according to claim 1, 2, 3, 4 or 5, further including:
   third control means for inhibiting the accumulation of the signal in said sensor means during the periods other than said plurality of time sections for the signal accumulation controlled by said first control means.

8. A radiation sensing system including:
   (A) at least one radiation sensing element responsive to a radiation to produce an electrical signal;
   (B) at least one accumulating element for accumulating therein the produced signal of said sensing element;
   (C) first control means for dividing a preset signal accumulating time into a plurality of discontinuous time sections and causing said accumulating element to accumulate the produced signal of said sensing element only during each of said time sections; and
   (D) second control means for reading out the accumulated signal from said accumulating element after termination of the signal accumulation by said plurality of time sections.

9. The system according to claim 8, wherein said first control means is designed to vary the number of sections of the accumulating time in accordance with the length of the preset signal accumulating time.

10. The system according to claim 9, wherein said first control means is designed to divide said preset accumulating time so that the time lengths of said time sections are equal to each other.

11. The system according to claim 10, wherein said first control means is designed to divide said preset accumulating time into a plurality of discontinuous time sections which are within a predetermined period.

12. The system according to claim 11, wherein said first control means includes a rate multiplier.

13. The system according to claim 8, 9, 10, 11 or 12, further including:
- a clearing element for clearing the produced signal of said sensing element; and
- third control means for causing said clearing element to clear the produced signal of said sensing element during the periods other than said plurality of time sections for the signal accumulation controlled by said first control means.

14. The system according to claim 13, wherein said sensing element, said accumulating element and said clearing element together constitute a radiation sensing device.

15. The system according to claim 14, wherein said sensing device further includes:
- an output portion for putting out the accumulated signal of said accumulating element; and
- a transfer portion for transferring the accumulated signal of said accumulating element to said output portion under the control of said second control means.

16. The system according to claim 15, wherein said sensing device is a CCD sensor.

17. The system according to claim 15, wherein said accumulating element is provided in at least a portion of said transfer portion.

18. The system according to claim 17, wherein said sensing device is a CCD sensor.

19. The system according to claim 8, 9, 10, 11 or 12, wherein said sensing element and said accumulating element together constitute a radiation sensing device.

20. The system according to claim 19, wherein said sensing device further includes:
- an output portion for putting out the accumulated signal of said accumulating element; and
- a transfer portion for transferring the accumulated signal of said accumulating element to said output portion under the control of said second control means.

21. The system according to claim 20, wherein said sensing device is a CCD sensor.

22. The system according to claim 20, wherein said accumulating element is provided in at least a portion of said transfer portion.

23. The system according to claim 22, wherein said sensing device is a CCD sensor.

24. A radiation sensing system including:
- (A) signal accumulating type radiation sensor means having at least one radiation sensing element responsive to a radiation to produce an electrical signal;
- (B) presetting means for presetting the signal accumulating time of said sensor means; and
- (C) control means for controlling the accumulation of the produced signal of said sensing element in said sensor means in accordance with the signal accumulating time preset by said presetting means, said control means having a plurality of different control modes, selecting one of said plurality of control modes in accordance with said preset accumulating time and controlling the accumulation of the signal in said sensor means by the selected control mode.

25. The system according to claim 24, wherein the first one of said plurality of control modes of said control means is a mode in which said preset accumulating time is divided into a plurality of discontinuous time sections and said sensor means effects the signal accumulation only during each time section, and the second one of said plurality of control modes is a mode in which said sensor means continuously effects the signal accumulation during said preset accumulating time.

26. The system according to claim 25, wherein said control means includes:
- an accumulation controlling circuit for controlling the signal accumulation in said sensor means by said first and second control modes in accordance with said preset accumulating time; and
- a mode designating circuit for designating the control mode of said accumulation controlling circuit in accordance with the length of the signal accumulating time preset by said presetting means, said designating circuit designating said first control mode when said preset accumulating time is shorter than a predetermined time.

27. A radiation sensing system including:
- (A) at least one radiation sensing element responsive to a radiation to produce an electrical signal;
- (B) at least one accumulating element for accumulating the produced signal of said sensing element; and
- (C) control means for controlling the accumulation of the produced signal of said sensing element by said accumulating element in accordance with a preset signal accumulating time, said control means having a plurality of different control modes, selecting one of said plurality of control modes in accordance with said preset accumulating time and controlling the accumulation of the signal in said accumulating element by the selected control mode.

28. The system according to claim 27, wherein the first one of said plurality of control modes of said control means is a mode in which said preset accumulating time is divided into a plurality of discontinuous time sections and said accumulating element effects the signal accumulation only during each time section, and the second one of said plurality of control modes is a mode in which said accumulating element continuously effects the signal accumulation during said preset accumulating time.

29. The system according to claim 28, wherein said control means includes:
- an accumulation controlling circuit for controlling the signal accumulation in said accumulating element by said first and second control modes in accordance with said preset accumulating time; and
- a mode designating circuit for designating the control mode of said accumulation controlling circuit in accordance with the length of the signal accumulating time preset by said presetting means, said designating circuit designating said first control mode when said preset accumulating time is shorter than a predetermined time.

30. The system according to claim 27, 28 or 29, wherein said sensing element and said accumulating element together constitute a radiation sensing device.

31. The system according to claim 30, wherein said sensing device includes:
- an output portion for putting out the accumulated signal of said accumulating element; and
- a transfer portion for transferring the accumulated signal of said accumulating element to said output portion.

32. The system according to claim 31, wherein said sensing device is a CCD sensor.

33. The system according to claim 31, wherein said accumulating element is provided in at least a portion of said transfer portion.

34. The system according to claim 33, wherein said sensing device is a CCD sensor.

* * * * *